(12) United States Patent
Etou et al.

(10) Patent No.: US 9,486,867 B2
(45) Date of Patent: Nov. 8, 2016

(54) CHAINSAW

(71) Applicant: HITACHI KOKI CO., LTD., Tokyo (JP)

(72) Inventors: Yasuo Etou, Hitchinaka (JP); Satoru Matsuno, Hitachinaka (JP); Kouji Sagawa, Hitachinaka (JP); Miyoji Onose, Hitachinaka (JP); Yasutaka Shimizu, Hitachinaka (JP); Ai Nakayama, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 172 days.

(21) Appl. No.: 14/372,957

(22) PCT Filed: Dec. 25, 2012

(86) PCT No.: PCT/JP2012/008269

§ 371 (c)(1),
(2) Date: Jul. 17, 2014

(87) PCT Pub. No.: WO2013/108348

PCT Pub. Date: Jul. 25, 2013

(65) Prior Publication Data

US 2014/0345149 A1    Nov. 27, 2014

(30) Foreign Application Priority Data

Jan. 18, 2012   (JP) ................. 2012-008261

(51) Int. Cl.
*B23D 57/02*    (2006.01)
*B27G 19/06*    (2006.01)
*B27B 17/08*    (2006.01)

(52) U.S. Cl.
CPC ........... *B23D 57/023* (2013.01); *B27B 17/083* (2013.01)

(58) Field of Classification Search
CPC   B23D 57/023; B23D 59/002; B23D 59/008; B27B 17/0083; B27B 17/083
See application file for complete search history.

(56) References Cited

U.S. PATENT DOCUMENTS 4,152,833 A    5/1979  Phillips
4,382,334 A    5/1983  Reynolds (Continued)

FOREIGN PATENT DOCUMENTS

CN       102183324 A    9/2011
EP        1946899 A1    7/2008

(Continued)

OTHER PUBLICATIONS

Notification of First Office Action Chinese Patent Application No. 2012800674376 dated Jun. 23, 2015 with English translation.

(Continued)

*Primary Examiner* — Stephen Choi
(74) *Attorney, Agent, or Firm* — McDermott Will & Emery LLP

(57) ABSTRACT

A chainsaw having improved cutting workability is provided. A chainsaw is used to cut an object to be worked by a saw chain. A chainsaw main body is provided with an electric motor and a sprocket, and a guide bar around which the saw chain is wound is provided on the chainsaw main body. The guide bar is attached to the chainsaw main body by a screw member serving as an attaching member. A load sensor detects whether or not the guide bar is attached to the chainsaw main body. Rotation of the saw chain is prohibited based upon a signal from the load sensor when the guide bar is not attached to the chainsaw main body.

8 Claims, 8 Drawing Sheets

(56) References Cited

U.S. PATENT DOCUMENTS

| | | | |
|---|---|---|---|
| 4,920,649 A | 5/1990 | Strom et al. | |
| 2004/0181951 A1* | 9/2004 | Wittke | B23D 59/001 30/382 |
| 2006/0120796 A1* | 6/2006 | Kobayashi | F16B 21/09 403/14 |
| 2006/0196058 A1 | 9/2006 | Warfel et al. | |
| 2012/0036725 A1* | 2/2012 | Osborne | B27B 17/083 30/383 |

FOREIGN PATENT DOCUMENTS

| | | |
|---|---|---|
| JP | 58-10438 A | 1/1983 |
| JP | 10-80841 A | 3/1998 |
| JP | 2006106849 A * | 4/2006 |
| JP | 2006-161871 A | 6/2006 |
| JP | 2006-238876 A | 9/2006 |
| JP | 2011-74856 A | 4/2011 |
| JP | 2011-136384 A | 7/2011 |

OTHER PUBLICATIONS

Notification of Reasons for Refusal Japanese Patent Application No. 2012-008261 dated Oct. 20, 2015 with English translation.

International Search Report issued in International Application No. PCT/JP2012/008269 mailed Jun. 3, 2013.

* cited by examiner

CHAINSAW

RELATED APPLICATIONS

This application is the U.S. National Phase under 35 U.S.C. §371 of International Application No. PCT/JP2012/008269, filed on Dec. 25, 2012, which in turn claims the benefit of Japanese Application No. 2012-008261, filed on Jan. 18, 2012, the disclosures of which are incorporated by reference herein.

TECHNICAL FIELD

The present invention relates to a chainsaw for cutting an object to be worked such as wood using a saw chain.

BACKGROUND ART

A chainsaw used to cut an object to be worked such as wood has a loop-like saw chain provided with a blade portion projecting outward, namely, a chainsaw. The saw chain is movably wound around a guide bar having a base end portion fixed to a housing, and it is rotationally driven by a driving source provided within the housing. As the driving source, an engine or an electric motor is used. As the chainsaw using the electric motor as the driving source, there is one described in Japanese Patent Application Laid-Open Publication No. 2011-136384 (PTL 1).

CITATION LIST

Patent Literature

PTL 1: Japanese Patent Application Laid-Open Publication No. 2011-136384

SUMMARY OF INVENTION

Technical Problem

The chainsaw has a case assembly as a chainsaw main body provided with the driving source, and the guide bar is attachably and detachably, namely, in a removable fashion, mounted to the chainsaw main body so as to project forward. The saw chain cutting an object to be worked is continuously wound around a sprocket that is rotationally driven by the driving source and around the guide bar, so that the saw chain is rotationally driven by the sprocket. A main handle projecting rearward is provided at a rear end portion of a main body case. A sub-handle projecting laterally is provided on an upper side of the main body case. A worker performs cutting work of the object to be worked in a state that he/she is lifting the chainsaw by grasping the main handle with his/her one hand while grasping the sub-handle with the other hand.

In the chainsaw utilizing the electric motor as the driving source, a trigger switch, namely, an actuation switch is provided on the main handle. When the worker performs cutting work, the electric motor is driven and the saw chain is rotationally driven by his/her operation of the actuation switch.

When the saw chain is loosened due to a long term use of the chainsaw, after the position adjustment of the guide bar in its longitudinal direction is performed, the guide bar is fixed to the main body case, again. When a teeth portion of the saw chain is worn away, the saw chain is detached from the chainsaw for replacement of the worn saw chain by a new one or setting of the teeth portion, and the new saw chain or the set saw chain is wound around the guide bar. To perform the position adjustment of the guide bar, a bolt which is a screw member for attaching the guide bar to the main body case is loosened. To detach the guide bar from the main body case, the bolt is loosened and the guide bar is detached from the main body case.

When such a position adjustment of the guide bar or such attaching and detaching operations of the saw chain is performed, unless the guide bar is attached to the main body case securely, the guide bar is moved and the saw chain is loosened during cutting work. If the saw chain is loosened, desired cutting work cannot be performed, so that a fixing work of the guide bar must be performed by interrupting the cutting work, resulting in deterioration of workability.

A preferred aim of the present invention is to improve the cutting workability of a chainsaw.

Solution to Problem

A chainsaw according to the present invention is a chainsaw for cutting an object to be worked by a saw chain provided with a plurality of tooth portions, including: a chainsaw main body provided with a driving source and a sprocket rotationally driven by the driving source; a guide bar which is attachably and detachably mounted to the chainsaw main body and around which the saw chain rotationally driven by the sprocket is wound; an attaching member which mounts the guide bar to the chainsaw main body; and a detector which detects whether or not the guide bar is attached to the chainsaw main body; and a rotation control portion which prohibits rotation of the saw chain based upon a signal from the detector when the guide bar is not attached to the chainsaw main body.

In the chainsaw of the present invention, the detector is a load sensor which detects that the guide bar is attached to the chainsaw main body. In the chainsaw of the present invention, the detector is a limit switch which detects that the guide bar is attached to the chainsaw main body. In the chainsaw of the present invention, the driving source is not actuated when the guide bar is not attached to the chainsaw main body. In the chainsaw of the present invention, an actuation switch provided on the chainsaw main body is made inoperable when the guide bar is not attached to the chainsaw main body. In the chainsaw of the present invention, a clutch provided between the driving source and the sprocket is in a declutched state when the guide bar is not attached to the chainsaw main body. In the chainsaw of the present invention, an alarming tool provided on the chainsaw main body is actuated when the guide bar is not attached to the chainsaw main body. In the chainsaw of the present invention, the attaching member functions so as to attach a chain cover covering a base portion of the guide bar to the chainsaw main body and to attach the guide bar to the chainsaw main body.

Advantageous Effects of Invention

According to the present invention, when the guide bar rotatably supporting the saw chain is not attached to the chainsaw main body, rotation of the saw chain is prohibited, so that the guide bar is prevented from being loosened during cutting work. Since the guide bar is prevented from being loosened during cutting work, it is unnecessary to stop the cutting work to conduct work for fixing the guide bar, so that cutting workability using the chainsaw can be improved.

The prohibition of rotation of the saw chain is performed by preventing actuation of the driving source for driving the chain, by making operation of the actuation switch inoperable, or by preventing rotational motion of the driving source from being transmitted to the chain.

DESCRIPTION OF EMBODIMENTS

Figure 1:
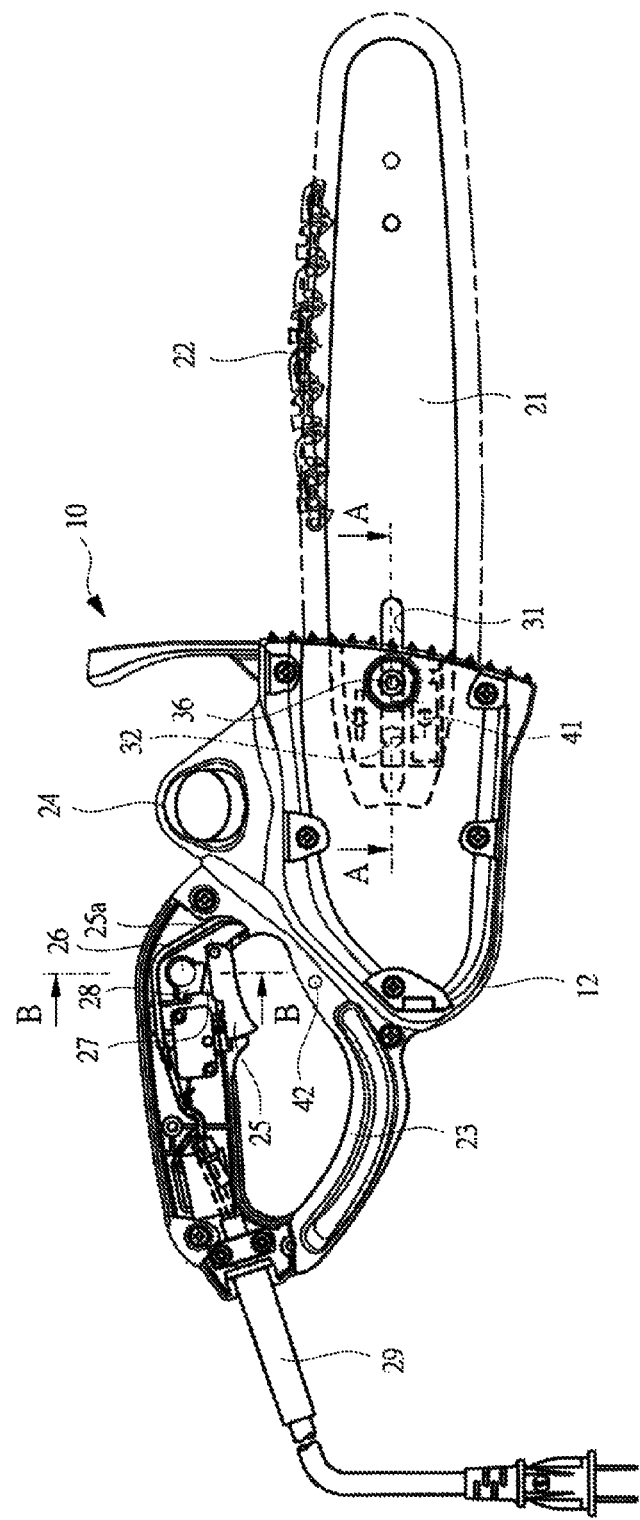
FIG. 1 is a partially cutaway front view showing an embodiment of the present invention.
Figure 2:
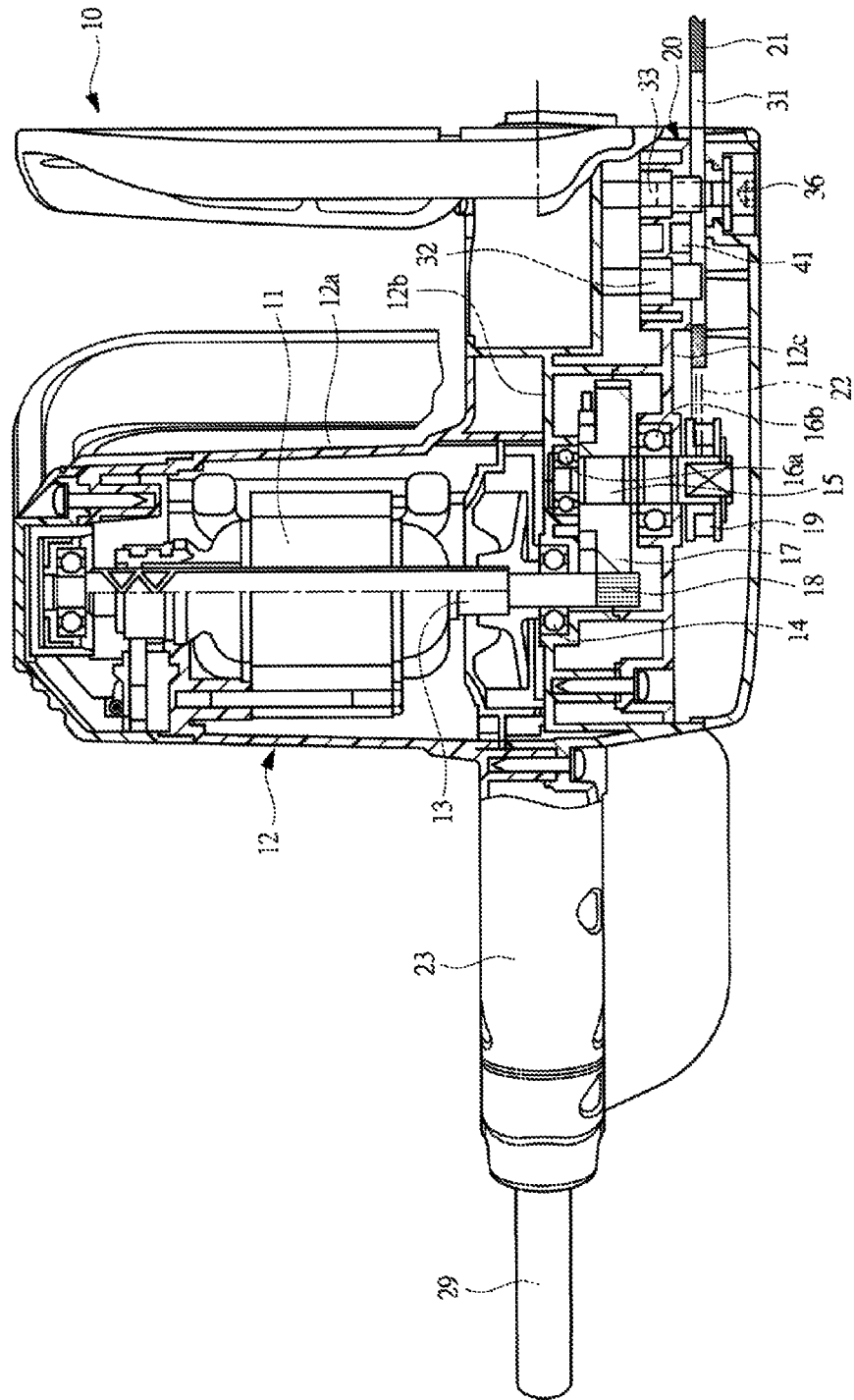
FIG. 2 is a partially cutaway plan view in FIG. 1.

Hereinafter, examples of the present invention will be described with reference to the drawings. As illustrated in FIGS. 1 and 2, a chainsaw 10 has a chainsaw main body 12 which houses an electric motor 11 serving as a driving source. The chainsaw main body 12 is formed by assembling a plurality of case members made of hard resin materials, respectively. And the chainsaw main body 12 is formed of a case assembly composed of the plurality of case members. As illustrated in FIG. 2, the electric motor 11 is provided within a case member 12a, and a bearing 14 rotatably supporting a motor main shaft 13 is mounted inside a case member 12b caused to abut on the case member 12a.

A driving shaft 15 is arranged in a space between the case member 12b and a case member 12c caused to abut on the case member 12b, and one end portion of the driving shaft 15 is rotatably supported by a bearing 16a mounted to the case member 12b, while the other end portion thereof is rotatably supported by a bearing 16b mounted to the case member 12c. A large gear 17 provided on the driving shaft 15 meshes with a small gear 18 provided at a distal end of the motor main shaft 13, so that the driving shaft 15 is rotationally driven by the electric motor 11.

A sprocket 19 is provided at a distal end portion of the driving shaft 15, and the sprocket 19 is arranged outside the case member 12c serving as the chainsaw main body 12. A guide bar attaching portion 20 is provided at a front side portion of the chainsaw main body 12 to be at further front than the sprocket 19, and a guide bar 21 is attachably and detachably, namely, in a removable fashion, mounted to the guide bar attaching portion 20. As illustrated in FIG. 2, a loop-like endless chain, namely, a saw chain 22 is wound around the guide bar 21, and the saw chain 22 is also wound around the sprocket 19 in a meshing state therewith. Thus, the saw chain 22 wound around the sprocket 19 and the guide bar 21 is rotationally driven by the electric motor 11 while it is guided by the guide bar 21. The saw chain 22 is provided with a plurality of tooth (blade) portions disposed at predetermined intervals, and the respective tooth portions project outward. By rotating the saw chain 22, an object to be worked such as wood can be cut by the saw chain 22.

As illustrated in FIG. 1, a rear handle projecting rearward, namely, a main handle 23 is provided at a rear end portion of the chainsaw main body 12, and a front handle extending along the case member 12a housing the electric motor 11, namely, a sub-handle 24 is provided on an upper side of the chainsaw main body 12 laterally. A worker conducts a cutting work of an object to be worked in a state that he/she is lifting the chainsaw 10 by grasping the main handle 23 with his/her one hand, and grasping the sub-handle 24 with the other hand. As illustrated in FIG. 1, a trigger switch for actuating the electric motor 11, namely, an actuation switch 25 is provided within the main handle 23 to be capable of swinging about a pin 25a. An off-lock switch 26 is provided on the main handle 23 to be capable of projecting and moving from a side face of the main handle 23, and the off-lock switch 26 is provided with a cam portion 28 engaged with an engagement portion 27 provided on the actuation switch 25. The off-lock switch 26 is biased by a spring member (not shown) whose spring force acts in a direction in which a distal end portion of the off-lock switch 26 projects outside the main handle 23, and when the off-lock switch 26 is in a non-operated state, the cam portion 28 is engaged with the engagement portion 27 so that actuating operation of the actuation switch 25 is restricted. On the other hand, when the off-lock switch 26 is pushed in, the cam portion 28 is released from its position engaging with the engagement portion 27. Thus, when performing cutting of an object to be worked, a worker can operate the actuation switch 25 by pushing in the off-lock switch 26, so that the electric motor 11 is actuated according to operation of the actuation switch 25. A power feeding cable 29 is attached to the main handle 23 in order to feed power to the electric motor 11 from the outside.

However, as an aspect of the chainsaw, there is an aspect where power is fed to the electric motor 11 from a battery without driving the electric motor 11 by a commercial power source, and when such an aspect is adopted, the battery is mounted to the chainsaw main body 12.

Figure 3:
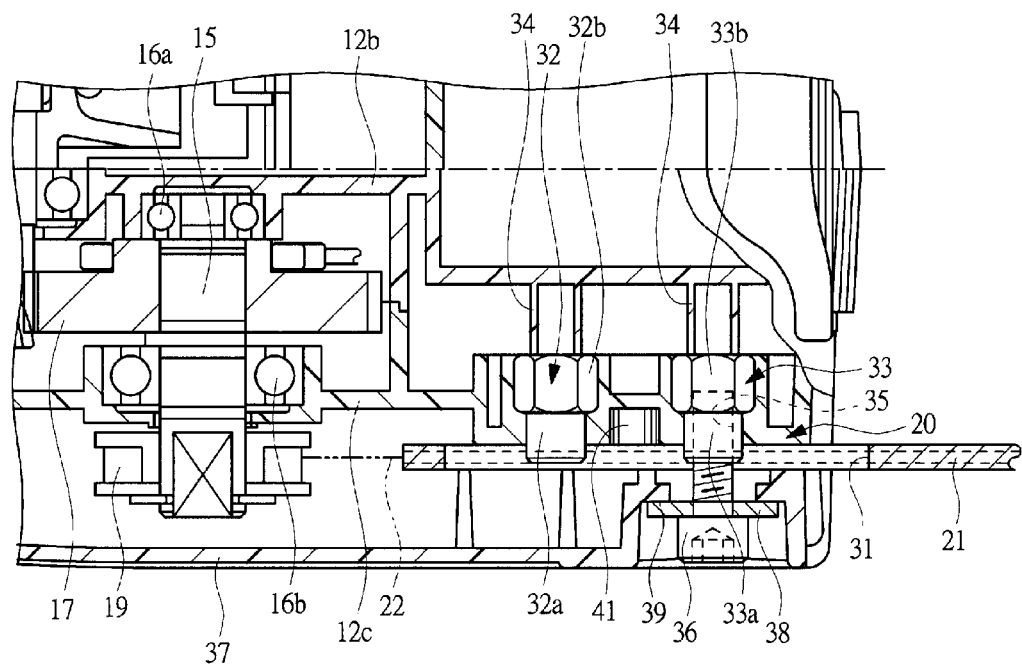
FIG. 3 is an enlarged cross-sectional view taken along the line A-A in FIG. 1.

A slotted hole 31 extending in a longitudinal direction is formed in a base end portion of the guide bar 21. As illustrated in FIG. 3, two guide pins 32 and 33 projecting into the slotted hole 31 are attached to the chainsaw main body 12. The respective guide pins 32 and 33 are attached such that they are separated from each other in the longitudinal direction of the guide bar 21, so that the guide bar 21 can be adjusted and moved in the longitudinal direction as a plurality of the guide pins 32 and 33 guide the guide bar 21. The respective guide pins 32 and 33 have guide portions 32a and 33a having a circular outer peripheral face, and attaching portions 32b and 33b integral with the guide portions. The attaching portions 32b and 33b have hexagonal outer peripheral faces and they have corners on the outer peripheral faces. The respective guide pins 32 and 33 are made integral with the case member 12c by performing insert molding when molding the case member 12c or by inserting the guide pins into attaching holes formed when the case member 12c is molded to assemble the guide pins in the attaching holes of the case member 12c. Abutting portions 34 which are caused to abut on end faces of the respective guide pins 32 and 33 are provided on the case member 12b on which the case member 12c is caused to abut, so that the guide pins 32 and 33 are prevented from coming off.

A screw hole 35 is formed in one guide pin 33, and a screw member 36 serving as an attaching member is screwed into the screw hole 35. The guide bar 21 is attached to the guide bar attaching portion 20 of the chainsaw main body 12 by the screw member 36.

A chain cover 37 covering the guide bar attaching portion 20 and the sprocket 19, for attaching the guide bar 21 to the chainsaw main body 12 at a base portion of the chain cover 37, is attachably and detachably mounted to the chainsaw main body 12. The chain cover 37 is attached to the chainsaw main body 12 by the screw member 36 screwed into the screw hole 35 of the guide pin 33. Thus, the screw member 36 functions both to attach the guide bar 21 to the chainsaw main body 12 and to attach the chain cover 37 to the chainsaw main body 12. The screw member 36 is mounted with a washer 38, so that the washer 38 comes in contact with a bottom face of a recessed portion 39 provided in the chain cover 37.

In the chainsaw 10 as illustrated, the screw member 36 is used for attaching the guide bar 21 and the chain cover 37 to the chainsaw main body 12, but such a configuration may be adopted that the guide bar 21 and the chain cover 37 are attached to the chainsaw main body 12 by different screw members.

When the saw chain is loosened due to a long term use of the chainsaw, the guide bar 21 is fixed to the chainsaw main body 12 by the screw member 36 after position adjustment of the guide bar 21 in a longitudinal direction thereof is performed under such a state that the screw member 36 is loosened. Further, when the blade portion of the saw chain 22 is worn away, the saw chain 22 is detached from the chainsaw main body 12 for replacement of the worn saw chain 22 by a new one 22 or setting of the worn saw chain 22, and the guide bar 21 is also detached at this time. When the saw chain 22 is mounted to the chainsaw main body 12 again, the guide bar 21 is attached to the chainsaw main body 12 by the screw member 36 in such a state that the saw chain 22 is wound around the sprocket 19 and the guide bar 21. Thus, when the guide bar 21 is attached to the chainsaw main body 12 by the screw member 36, it is necessary to screw the screw member 36 into the screw hole 35 of the guide pin 33 securely.

A load sensor 41 serving as a detector is provided on the case member 12c to detect whether or not the guide bar 21 is attached to the chainsaw main body 12 securely. The load sensor 41 has a strain gauge having its electric resistance varying in response to attaching stress that occurs when the guide bar 21 is attached to load sensor 41, and it is also called "load cell". It is determined based upon a signal from the load sensor 41 that the guide bar 21 is attached to the chainsaw main body 12 with a desired attaching force, when a pushing force to the load sensor 41 from the guide bar 21 exceeds a predetermined determination value. Based upon a signal from the load sensor 41, when the guide bar 21 is attached to the guide bar attaching portion 20, rotation of the saw chain 22 is allowed, but when the guide bar 21 is not attached to the guide bar attaching portion 20, rotation of the saw chain 22 is prohibited. An alarm lamp 42 composed of an LED serving as an alarming tool for informing a worker of prohibition of rotation of the saw chain 22 when the rotation is prohibited is provided on the chainsaw main body 12, as illustrated in FIG. 1. Instead of the alarm lamp 42 or in addition to the alarm lamp 42, an alarm buzzer may be provided on the chainsaw main body 12 as another alarming tool.

Figure 8A:
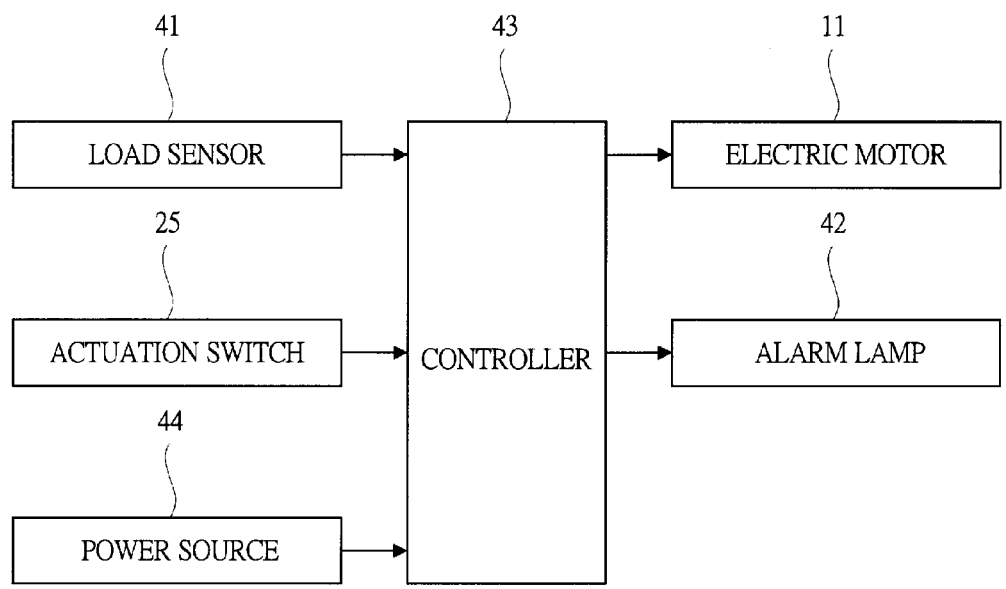
FIG. 8(A) is a block diagram showing a rotation control circuit of a saw chain for controlling an electric motor to an actuated state and an actuation-stopping state based upon a signal from a load sensor illustrated in FIG. 3.

FIG. 8(A) is a block diagram showing a rotation control circuit of the saw chain for controlling the electric motor to an actuating state and an actuation-stopping state based upon a detection signal from the load sensor 41 illustrated in FIG. 3. The rotation control circuit serving as the rotation control portion includes a controller 43 to which the detection signal of the load sensor 41 and detection signals of ON and OFF of the actuation switch 25 are inputted. Power supply from the power source 44 to the electric motor 11 and interruption of power supply are controlled by the controller 43. The controller 43 supplies power to the electric motor 11 according to a signal from the load sensor 41 when the actuation switch 25 is operated in a state of application of a predetermined fastening force caused by attaching of the guide bar 21 by the screw member 36. On the other hand, when the screw member 36 is in a non-fixed state, even when the actuation switch 25 is operated, power supply to the electric motor 11 is interrupted by the controller 43, and actuation of the electric motor 11 is stopped and the alarm lamp 42 is turned on.

Figure 4:
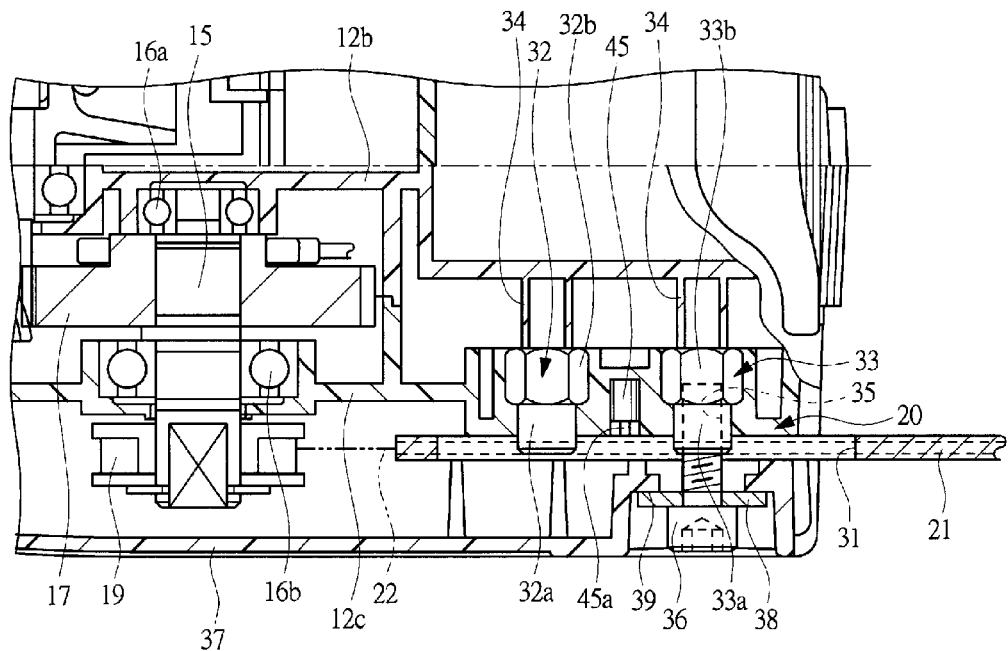
FIG. 4 is a cross-sectional view showing a guide bar attaching portion in a chainsaw according to another embodiment of the present invention.
Figure 5:
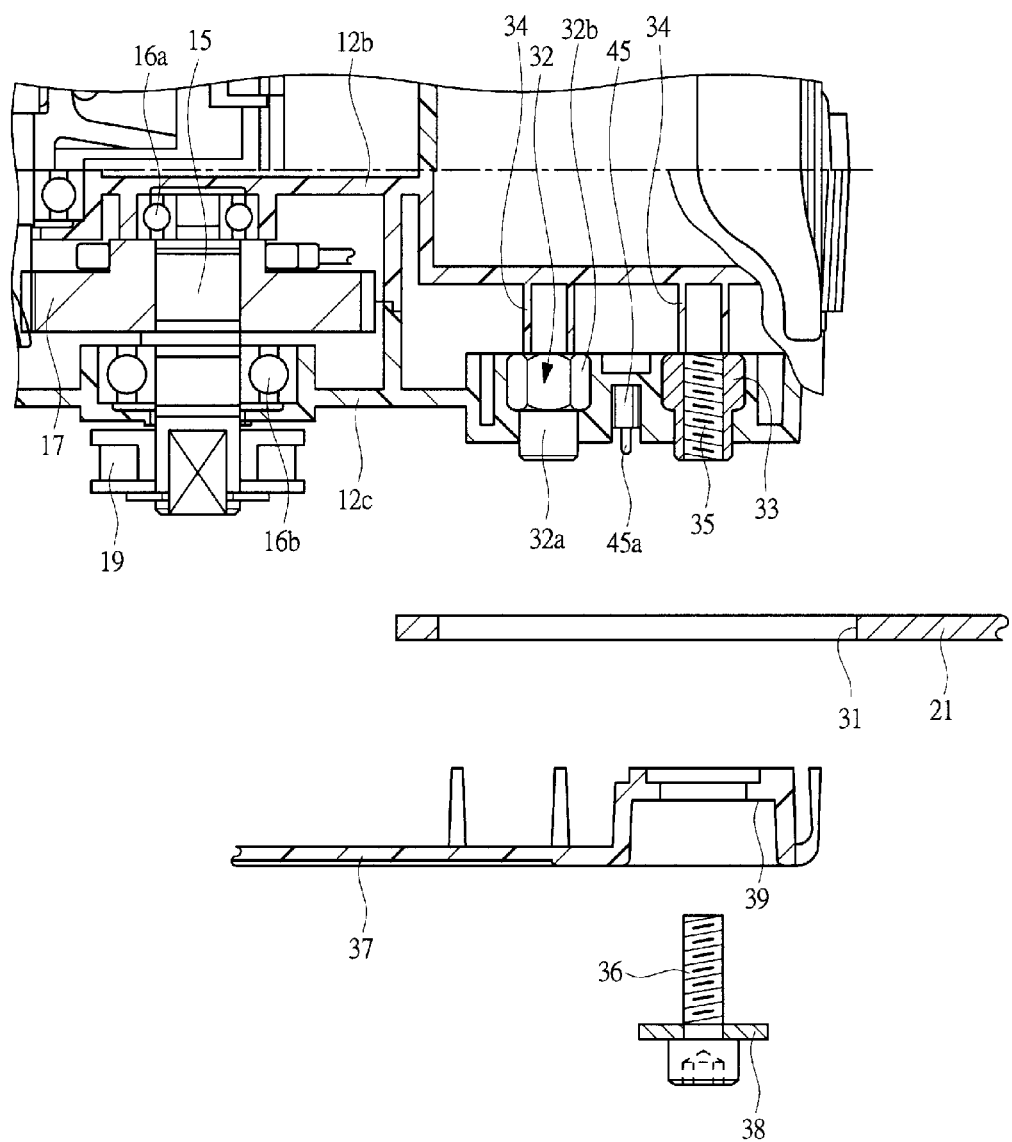
FIG. 5 is a cross-sectional view showing the guide bar attaching portion in a state where a guide bar illustrated in FIG. 4 is detached.

FIG. 4 is a cross-sectional view illustrating the guide bar attaching portion 20 in the chainsaw according to another embodiment of the present invention. FIG. 5 is a cross-sectional view illustrating the guide bar attaching portion 20 in a state where the guide bar 21 illustrated in FIG. 4 is detached. In the chainsaw 10, a limit switch 45 is provided on the guide bar attaching portion 20 instead of the load sensor 41 illustrated in FIG. 3. A contact piece 45a of the limit switch 45 projects from the guide bar attaching portion 20 in a state where the guide bar 21 is detached from the chainsaw main body 12, as illustrated in FIG. 5. On the other hand, when the guide bar 21 is attached to the chainsaw main body 12, as illustrated in FIG. 4, the contact piece 45a is moved backward by the guide bar 21, so that a detection signal is outputted from the limit switch 45.

Figure 8B:
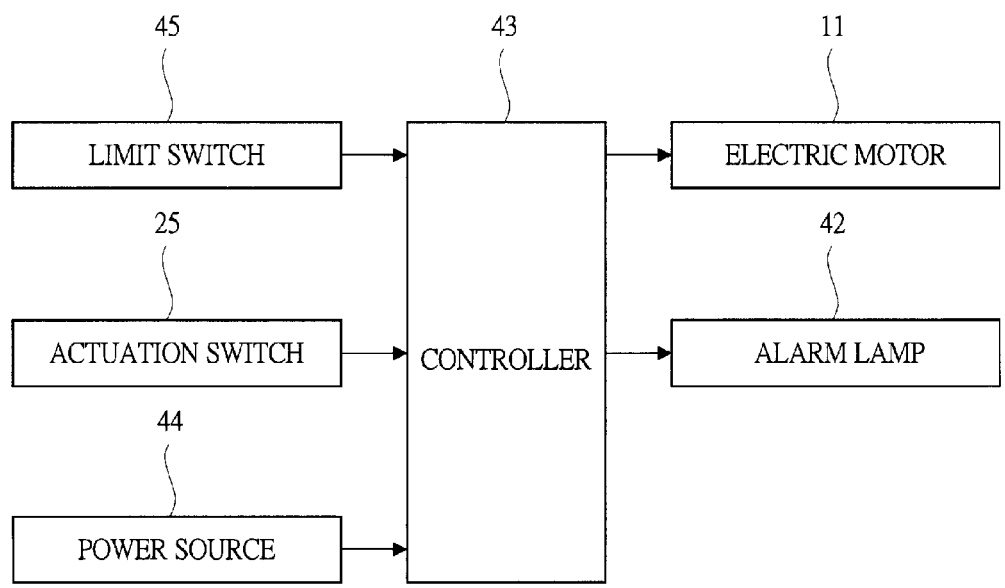
FIG. 8(B) is a block diagram showing a rotation control circuit of a saw chain for controlling an electric motor to an actuated state and an actuation-stopping state based upon a signal from a limit switch.

FIG. 8(B) is a block diagram illustrating the rotation control circuit of the chainsaw for controlling the electric motor to an actuating state and an actuation-stopping state based upon a detection signal from the limit switch 45.

The detection signal from the limit switch 45 is fed to the controller 43 illustrated in FIG. 8(B). When the guide bar 21 is attached by the screw member 36, power supply to the electric motor 11 and interruption of power supply are controlled based upon the detection signal from the limit switch 45 like the situation described above. When the actuation switch 25 is operated in a state where a predetermined fixing force is applied by attaching the guide bar 21 using the screw member 36, power is supplied to the electric motor 11. On the other hand, when the screw member 36 is not fixed, even when the actuation switch 25 is operated, power feeding to the electric motor 11 is stopped, actuation of the electric motor 11 is stopped, and the alarm lamp 42 is turned on.

Figure 6:
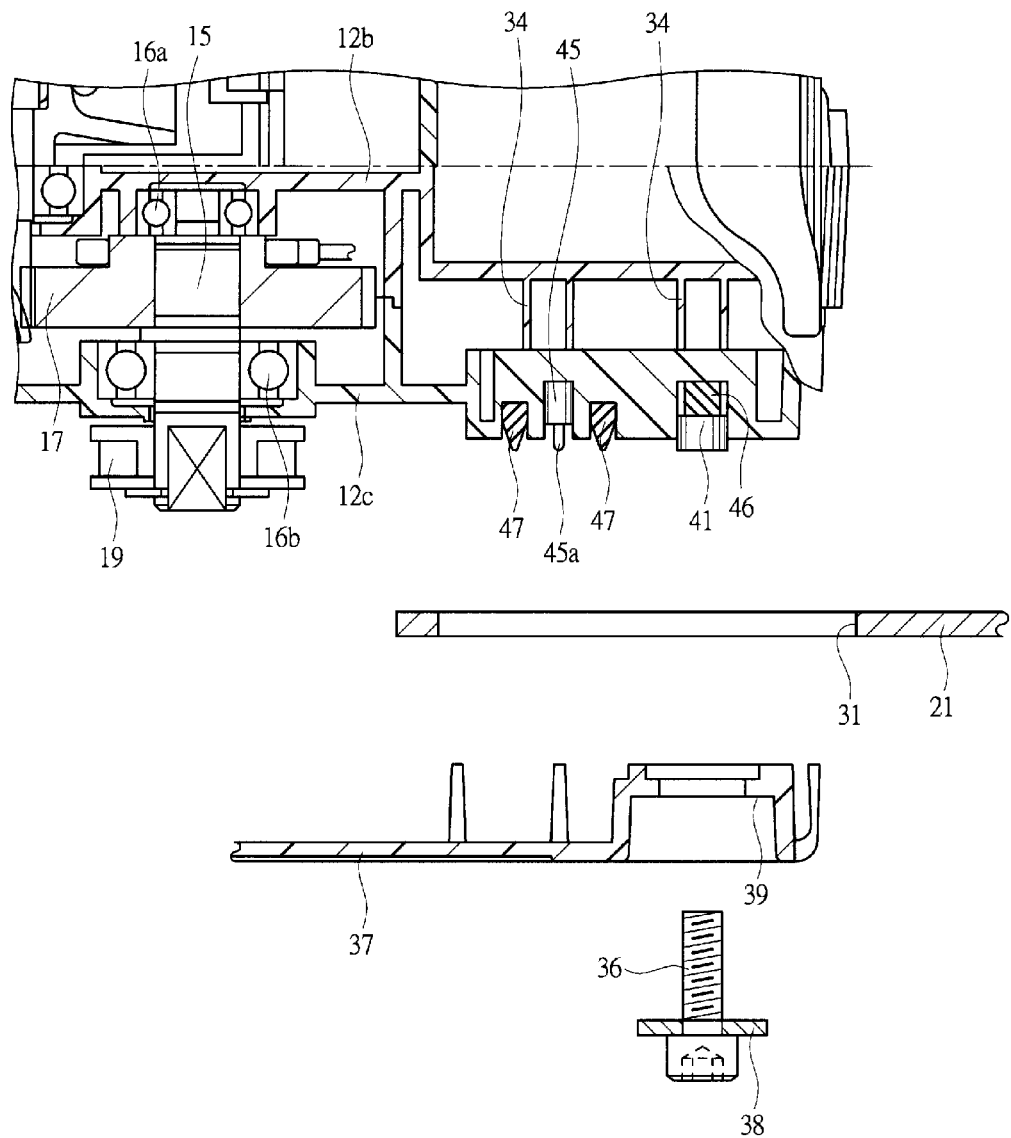
FIG. 6 is a cross-sectional view showing a guide bar attaching portion in a chainsaw according to another embodiment.

FIG. 6 is a cross-sectional view illustrating the guide bar attaching portion 20 in a chainsaw according to another embodiment of the present invention. FIG. 6 illustrates the guide bar attaching portion 20 in which the guide bar is detached in the same manner as illustrated in FIG. 5 and a lower portion positioned below the guide pins 32 and 33 in FIG. 1 is illustrated. The guide bar attaching portion 20 illustrated in FIG. 6 is provided with both the load sensor 41 and the limit switch 45 described above. A detection signal or detection signals is/are outputted from one or both of the load sensor 41 and the limit switch 45, so that power supply to the electric motor 11 is stopped when the guide bar 21 is not attached to the chainsaw main body 12.

In the guide bar attaching portion 20 illustrated in FIG. 6, an elastic body 46 such as rubber is provided on a back face side of the load sensor 41, and the load sensor 41 projects from a front face of the guide bar attaching portion 20 in a direction to abut to the guide bar 21 in a state where the guide bar 21 is detached from the chainsaw main body 12. When the guide bar 21 is attached to the guide bar attaching portion 20 in an aspect in which elastic force is imparted to the load sensor 41 in this manner, an attaching force applied from the elastic body 46 to the load sensor 41 is elevated. When the attaching force exceeds a determination value, power supply to the electric motor 11 is allowed.

As illustrated in FIG. 6, an elastic body 47 such as rubber is attached annularly around an opening portion of an attaching hole to which the limit switch 45 is attached so that a resistance force is added to the attaching force when attaching the guide bar 21 to the chainsaw main body 12 by the screw member 36. To attach the guide bar 21 to the guide bar attaching portion 20, the limit switch 45 outputs an ON signal when the elastic body 47 is shrunk until the guide bar 21 comes in contact with a front face of the case member 12b. By providing the elastic body 47 in this manner, the resistance force is added to the attaching force of the guide bar 21 when shrinking the elastic body 47, so that a detection signal is outputted when screw connection of the screw member 36 is completed against the elastic force.

As illustrated in FIG. 6, such a configuration may be adopted that the elastic body 46 is provided in a similar region also as to the load sensor 41 illustrated in FIG. 3. Further, as illustrated in FIG. 6, such a configuration may be adopted that the elastic body 47 is provided at a similar region regarding the limit switch 45 illustrated in FIG. 4.

Figure 7:
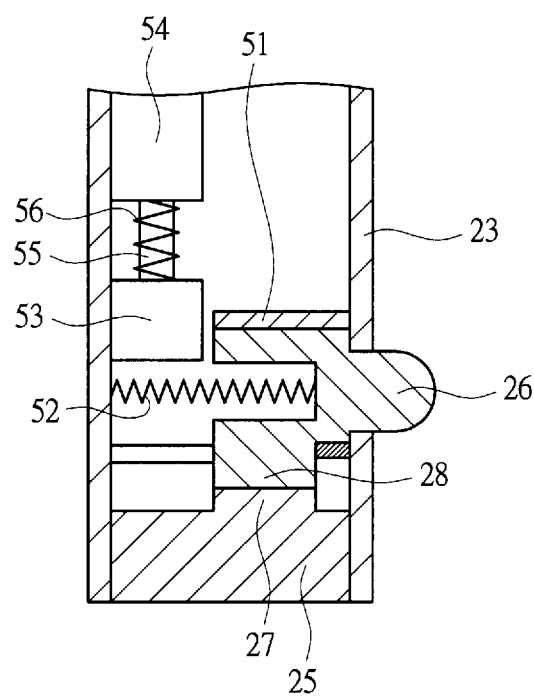
FIG. 7 is a cross-sectional view showing an off-lock switch in a chainsaw according to another embodiment.

FIG. 7 is a cross-sectional view illustrating an off-lock switch in the chainsaw 10 according to another example of the present invention and a portion corresponding to a cross section along the line B-B in FIG. 1 is illustrated.

The off-lock switch 26 is mounted so as to be capable of reciprocating by a guide member 51 provided within the main handle 23, and the off-lock switch 26 is biased in a direction of projecting the off-lock switch 26 to the outside of the main handle 23 by a spring force of a spring member 52. As illustrated in FIG. 7, the cam member 28 is engaged with the engagement portion 27 of the actuation switch 25 in a state where the off-lock switch 26 is projected due to the spring force, so that operation of the actuation switch 25 is restricted. On the other hand, when the off-lock switch 26 is pushed in, the cam portion 28 and the engagement portion 27 are disengaged from each other, so that operation of the actuation switch 25 is enabled. A stopper 53 meshing with the off-lock switch 26 is provided on the main handle 23 of the chainsaw 10 illustrated in FIG. 7 for prohibiting operation of the off-lock switch 26 to make the off-lock switch 26 inoperable. The stopper 53 is attached to an actuator 55 of a locking solenoid 54, and a spring member 56 for moving the stopper 53 to a position at which the stopper 53 meshes with the off-lock switch 26 is provided on the stopper 53.

Figure 9A:
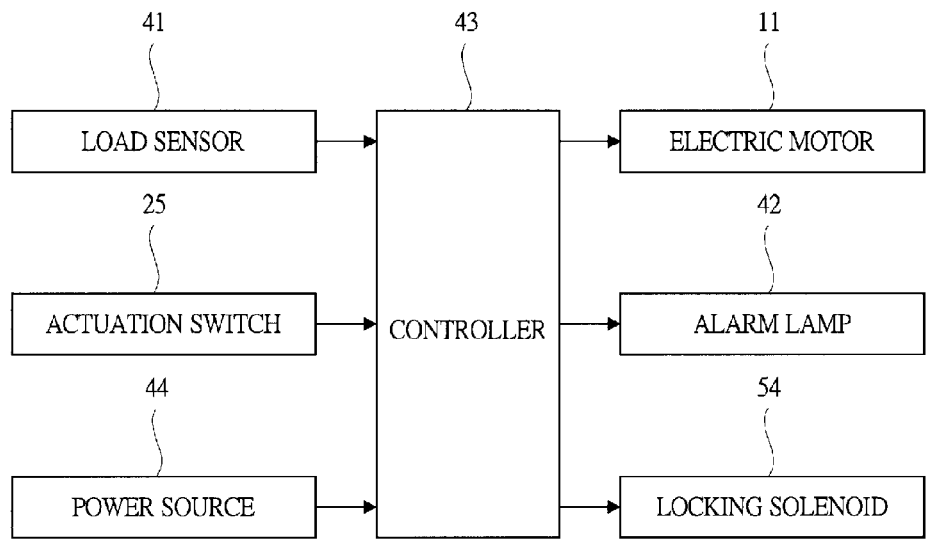
FIG. 9(A) is a block diagram showing a rotation control circuit of a saw chain having a cylinder for lock for switching an off-lock switch between an operative state and an inoperative state.

FIG. 9(A) is a block diagram illustrating a rotation control circuit of a saw chain in the chainsaw as illustrated in FIG. 7 having a locking cylinder for switching the off-lock switch between an operating state and an inoperable state. When it is detected by the load sensor 41 that the guide bar 21 is attached to the guide bar attaching portion 20, a driving signal is transmitted to a locking solenoid 54, and meshing between the stopper 53 and the off-lock switch 26 is cancelled so that actuation operation of the actuation switch 25 is allowed. In this manner, the saw chain 22 is rotationally driven by the electric motor 11. On the other hand, when the guide bar 21 is not attached to the guide bar attaching portion 20, operation of the actuation switch 25 is restricted, rotation of the saw chain 22 is prohibited, and the alarm lamp 42 is turned on.

As described above, the electric motor 11 is not actuated when the guide bar 21 is not attached to the guide bar attaching portion 20 in the aspects illustrated in FIGS. 8(A) and 8(B). However, rotation of the saw chain 22 is prohibited by prohibiting operation of the actuation switch 25 to put the actuation switch 25 in an inoperable state in the aspect illustrated in FIG. 9(A).

As the rotation prohibition aspect of the saw chain 22, as described above, there are the aspect of stopping rotation of the electric motor 11 serving as the driving source and the aspect of prohibiting operation of the actuation switch 25. Further, as another rotation prohibition aspect of the saw chain 22, there is an aspect where an electromagnetic clutch is provided between the motor main shaft 13 of the electric motor 11 and the sprocket 19, and rotation of the motor main shaft 13 is not transmitted to the sprocket 19 in a state where the electric motor 11 is being actuated.

Figure 9B:
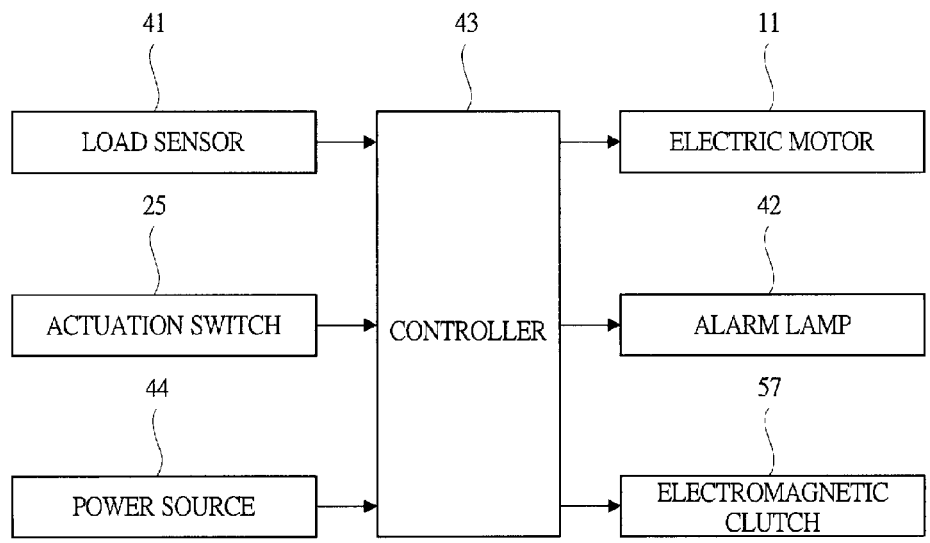
FIG. 9(B) is a block diagram showing a rotation control circuit of a saw chain having a clutch.

FIG. 9(B) is a block diagram illustrating a rotation control circuit of a saw chain configured to control an electromagnetic clutch 57 to a clutched state and a declutched state based upon a signal from the load sensor 41.

In this aspect, when it is detected by the load sensor 41 that the electromagnetic clutch 57 is brought into a connected state when the guide bar 21 is attached to the guide bar attaching portion 20; and the electromagnetic clutch 57 is brought into a declutched state and the alarm lamp 42 is turned on when the guide bar 21 is not attached to the guide bar attaching portion 20. In this aspect, even when the electric motor 11 is driven, the electromagnetic clutch 57 is brought into a declutched state, so that rotation of the saw chain 22 is brought into a prohibited state.

Note that, in FIGS. 9(A) and 9(B), the cases where it is detected by the load sensor 41 that attaching of the guide bar 21 is completed have been described. However, such a configuration may be adopted that attachment of the guide bar 21 is detected by the limit switch 45.

The present invention is not limited to the above embodiment and various modifications and alterations can be made within the scope of the present invention. For example, the illustrated chainsaw 10 uses the electric motor 11 as the driving source, but the present invention can be applied to a chainsaw using an engine as the driving source.

REFERENCE SIGNS LIST

10: Chainsaw
11: Electric motor
12: Chainsaw main body
13: Motor main shaft
14: Bearing
15: Driving shaft
16a, 16b: Bearing
17: Large gear
18: Small gear
19: Sprocket
20: Guide bar attaching portion 21: Guide bar
22: Saw chain
23: Main handle
24: Sub-handle
25: Actuation switch
26: Off-lock switch
27: Engagement portion
28: Cam portion
29: Power feeding cable
31: Slotted hole
32, 33: Guide pin
34: Abutting portion
35: Screw hole
36: Screw member
37: Chain cover
38: Washer
39: Recessed portion
41: Load sensor
42: Alarm lamp
43: Controller
44: Power source
45: Limit switch
46, 47: Elastic body
51: Guide member
52: Spring member
53: Stopper
54: Locking solenoid
55: Actuator
56: Spring member
57: Electromagnetic clutch

The invention claimed is:

1. A chainsaw for cutting an object to be worked by a saw chain provided with a plurality of teeth portions, the chainsaw comprising:
   a chainsaw main body provided with a driving source and a sprocket rotationally driven by the driving source;
   an operation switch operated by a worker to rotate the saw chain;
   a guide bar attachably and detachably mounted to the chainsaw main body, around which the saw chain driven by the sprocket is wound;
   a chain cover covering a part of the guide bar and the sprocket;
   an attaching member attaching the guide bar to the chainsaw main body via the chain cover;
   a detector detecting whether or not the guide bar and the chain cover are attached to the chainsaw main body; and
   a controller, coupled to the detector and provided on the chainsaw main body, configured to determine whether the guide bar is attached to the chainsaw main body based upon a signal from the detector, wherein
   the chainsaw main body has an attaching portion to which the guide bar is attached,
   the detector is provided at the attaching portion of the chainsaw main body,
   when the operation switch is operated and the controller determines that the guide bar and the chain cover are not attached to the chainsaw main body, the controller is configured to prohibit the saw chain to be rotated.

2. The chainsaw according to claim 1, wherein the detector is a load sensor which detects that the guide bar is attached to the chainsaw main body.

3. The chainsaw according to claim 1, wherein the detector is a limit switch which detects that the guide bar is attached to the chainsaw main body.

4. The chainsaw according to claim 1, wherein the driving source is not actuated when the guide bar is not attached to the chainsaw main body.

5. The chainsaw according to claim 1, wherein an actuation switch provided on the chainsaw main body is made inoperable when the guide bar is not attached to the chainsaw main body.

6. The chainsaw according to claim 1, wherein a clutch provided between the driving source and the sprocket is put into a declutched state when the guide bar is not attached to the chainsaw main body.

7. The chainsaw according to claim 1, wherein the attaching member functions so as to attach a chain cover covering a base portion of the guide bar to the chainsaw main body and to attach the guide bar to the chainsaw main body.

8. The chainsaw according to claim 1, further comprising an alarm tool actuated by the controller, wherein
   when the operation switch is operated and the controller determines that the guide bar and the chain cover are not attached to the chainsaw main body, the controller is configured to prohibit the saw chain to be rotated and actuate the alarm tool.

* * * * *